Feb. 21, 1939.    G. C. MONCKMEIER    2,148,242
AUTOMOBILE BUMPER POST
Filed April 14, 1937
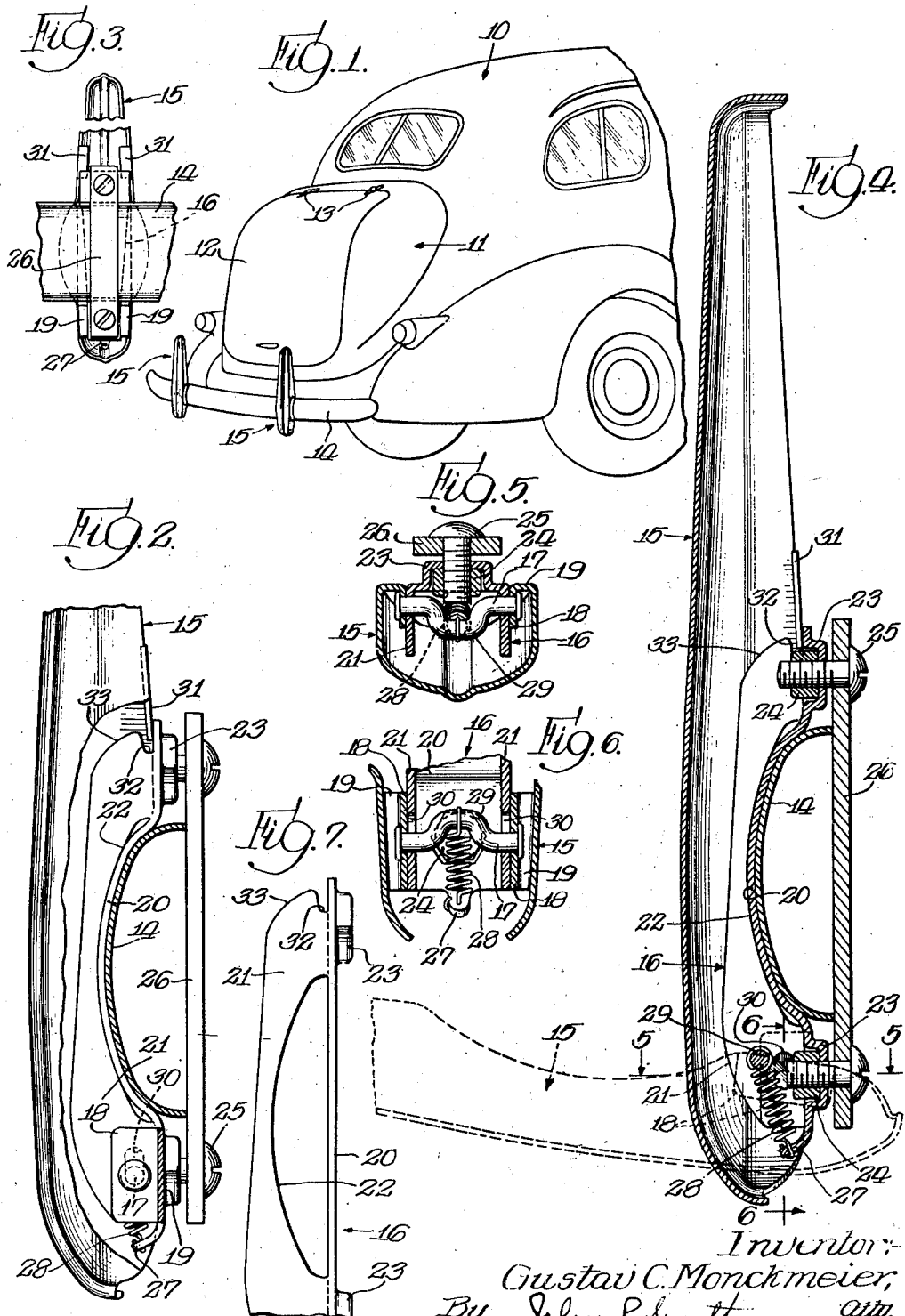
Inventor:
Gustav C. Monckmeier,
By John P. Smith   Atty.

Patented Feb. 21, 1939

2,148,242

UNITED STATES PATENT OFFICE 2,148,242

AUTOMOBILE BUMPER POST

Gustav C. Monckmeier, Davenport, Iowa

Application April 14, 1937, Serial No. 136,706

10 Claims. (Cl. 293—55)

The present invention relates generally to an automobile bumper post, but more particularly to a displaceable or pivoted bumper post adapted to be attached to the bumper of a motor vehicle so as to prevent marring or collision with the rear-luggage door or front grille or associated parts of the motor vehicle and to permit the displacement of the post with respect to the bumper so that the rear luggage carrier door or front hinged hood may be raised or opened and access had thereto.

One of the primary objects of the present invention is to provide a novel and improved displaceable and relatively high bumper post which is adapted to be secured to the bumper in the front or rear of a motor vehicle for guarding the adjacent parts thereof and permitting the swinging or displacement of the post so that a forwardly swinging engine hood or a luggage carrier door may be raised.

A further object of the invention is to provide a novel and improved pivoted bumper post adapted to be secured to the bumper of a motor vehicle whereby the same may be swung with respect to its support on the bumper in order that access may be had to the luggage carrier of the motor vehicle.

A still further object of the invention is to provide a novel and improved pivoted bumper post adapted to be attached to the bumper of a motor vehicle so that the same may be pivotally displaced in order that access may be had to the luggage carrier of the vehicle and quickly swung back into position and automatically locked in its normal vertical position with respect to the bumper.

Another object of the invention is to provide a novel and improved fitting or bracket adapted to be attached to various contours or shapes of bumpers and clamped thereto so that the clamping action of the fitting conforms the same to the contour or shape of the bumper for pivotally supporting a bumper post.

These and other objects are accomplished by providing a construction and an arrangement of the various parts in the manner hereinafter described and particularly pointed out in the appended claims.

Referring to the drawing:

Fig. 1 is a fragmentary perspective rear view of a motor vehicle showing one application of my improved bumper post secured to the bumper thereof;

Fig. 2 is an enlarged elevational view partly in cross section of my improved post;

Fig. 3 is a rear elevational view of the post shown in Fig. 2;

Fig. 4 is an enlarged cross sectional view taken on a vertical plane passing through the vertical center of the bumper post;

Fig. 5 is a cross sectional view taken on the line 5—5 in Fig. 4;

Fig. 6 is a cross sectional view taken on the line 6—6 in Fig. 4; and

Fig. 7 is a fragmentary side elevational view of one of the fitting members.

In illustrating one form of my invention I have shown the same in connection with a conventional form of motor vehicle generally indicated by the reference character 10 which is provided with the usual luggage carrier 11. These conventional luggage carriers are provided with doors 12 usually pivoted at the top edge as shown at 13. Secured to the rear end of the motor vehicle 10 and preferably to the chassis or frame is a conventional bumper 14. With these types of motor vehicles which are provided with the swinging luggage door 12 it becomes impossible to secure the conventional bumper post in position to protect the luggage door and carrier inasmuch as they form an obstruction and prevent the opening of the luggage door. Also, in motor vehicles having hinged hoods which swing upwardly from the front end thereof are usually obstructed if the bumper post is secured to the front bumper. It is therefore the primary purpose of the present invention to provide a quickly displaceable and quickly replaceable as well as a relatively high bumper post so that the same may be temporarily displaced in order that the luggage carrier door or pivoted hood may be raised unobstructedly. In order to accomplish this result, I have provided an improved quickly displaceable bumper post, generally indicated by the reference character 15, of any suitable construction or fanciful design having an upper portion extending a considerable distance above the top of the bumper 14 as clearly shown in Figs. 1 and 4 of the drawing. This bumper post is preferably made of sheet metal, though not necessarily, and is in the form of channel shaped member as clearly shown in Fig. 5 of the drawing. The bumper post 15 is displaceably or pivotally attached to one of the fitting members 16 by a pin 17. The outer ends of the pin 17 are secured to the opposite flanges 18 which are bent at right angles to the inwardly projecting ears 19 formed integrally with the post 15 at the lower end thereof. The fitting member 16 comprises a relatively flat portion as shown at 20 and two oppositely disposed flanges 21 formed at right angles to the flat portion 20 and opposite sides of flanges 21 so as to form in effect a channel. These opposite flanges 21 are slotted as shown at 22 (see Fig. 7) adjacent the flat portion 20 so that when the fitting is attached to the bumper 14 and clamped by the clamping member hereinafter described, the flat portion 20 of the fitting member 16 conforms to the curvature or contour of the bumper 14, as clearly shown in Figs. 2 and 4 of the drawing. The opposite ends of the portion 21 of the member 16 are recessed or counter-sunk as shown at 23 so as to accommodate the nuts 24 of the securing bolts 25 which secure the fitting to the bumper 14 by a strap 26. The lower end of the fitting member 16 is provided with a rearwardly projecting apertured ear 27 to which one end of a spring 28 is connected. The other end of the spring 28 is connected to an upwardly off-set portion 29 of the pin 17. The opposite flanges 21 of the fitting members 16 are provided with vertical slots 30 which embrace the pin 27 so that the spring 28 normally pulls the bumper post 15 downwardly with respect to the fitting member 16 for locking the post in its upright position with respect to its fitting in the manner hereinafter disclosed.

The post is locked in its upright position by two inwardly projecting flanges 31 formed integrally with the post 15 at substantially the center thereof. The lower edges of these flanges 31 are adapted to engage slots 32 formed in the upper ends of the flanges 21 as clearly shown in Figs. 2 and 3 of the drawing. These flanges 21 are also curved or tapered as shown at 33 so that the lower edges of the lugs 31 will ride into engagement and by merely pressing the post or swinging the same to its vertical position, the spring will be actuated to move the post downwardly to lock the tongues 31 into the slots 32 of the fitting member 16 in the manner clearly disclosed in Figs. 2 and 4 of the drawing.

Summarizing the operation of my improved displaceable bumper post, it will be readily seen that by pivotally connecting the lower end of the post to a fitting securely attached to the bumper, the same may be quickly unlocked and displaced from its vertical position to the dotted line position shown in Fig. 4 of the drawing so as to permit the raising of the luggage door 12 or a hinged hood as the case may be of the motor vehicle. Upon the closing of the door or the lowering of the hood, the bumper post may be swung upwardly to its vertical position and pressed against the fitting and the spring will snap or lock the post in its vertical position.

While I have described one embodiment of my invention, it will of course be understood that various other forms, namely that of swinging the post laterally on a fixed pivot with respect to a fitting or completely displacing the post with respect to its fitting, may be employed and still be within contemplation of my invention.

What I claim is my invention and desire to secure by Letters Patent is:

1. The combination with a bumper for a motor vehicle, of a fitting rigidly attached to said bumper, means for attaching a bumper post to said fitting, means for automatically locking said bumper post in a vertical position on said fitting, and means for permitting the quick displacement of said post with respect to said fitting.

2. The combination with a bumper for a motor vehicle, a bumper post therefor, and means for automatically locking said bumper post in vertical position with respect to said bumper and displacing it therefrom.

3. The combination with a bumper for a motor vehicle, a bumper post mounted on and normally vertical with respect to said bumper, means associated with said post for locking the same in vertical position, and means actuated by a slight displacement of said post for permitting its quick displacement with respect to said bumper.

4. The combination with a bumper for a motor vehicle, a fitting secured to said bumper, a bumper post pivotally mounted on said fitting for swinging movement with respect thereto, and spring actuated means for locking said post in vertical position with respect to said fitting.

5. The combination with a bumper for a motor vehicle, a fitting secured to said bumper, a bumper post pivotally mounted on said fitting for swinging movement with respect thereto, and means associated with said post for automatically locking the same in vertical position.

6. The combination with a bumper for a motor vehicle, a fitting secured to said bumper, a bumper post pivotally mounted on said fitting for swinging movement with respect thereto, and spring actuated means associated with said bumper post for automatically locking the same in vertical position.

7. The combination with a bumper for motor vehicle, a fitting secured to said bumper, a vertically extending bumper post pivotally mounted on said fitting for swinging movement with respect thereto, and spring actuated means carried by said post for latching said post in vertical position with respect to said fitting.

8. The combination with a bumper for motor vehicle, a fitting secured to said bumper, a vertically extending bumper post pivotally mounted on said fitting for swinging movement with respect thereto, spring actuated means carried by said post for latching said post in vertical position with respect to said fitting, and means for unlatching said post by slightly displacing said post with respect to said bumper.

9. A bumper guard comprising a base plate attachable to a bumper bar, a guard plate, and means providing a connection between the guard and base plates at two vertically spaced points, one of said connecting means comprising frictionally engaged opposed interfitting portions of said guard and base plates and the other a resilient pivotal mounting for the guard plate which yieldably retains said opposed interfitting portions in interlocked relationship, whereby said guard may be swung relative to said base plate by first moving said guard on its resilient mounting away from the base plate to disengage said opposed portions.

10. The combination with a vehicle bumper of a plate, means for securing the plate to the bumper, a bumper guard pivotally secured to the plate, the guard having a body portion extending above and below the bumper so as to increase the effective vertical width of the bumper, and quickly releasable spring means for locking the unpivoted end of the guard to the bumper and for holding it against rattling.

GUSTAV C. MONCKMEIER.